United States Patent [19]
Johnson et al.

[11] 4,084,029
[45] Apr. 11, 1978

[54] SINE WAVE BEAM WEB AND METHOD OF MANUFACTURE

[75] Inventors: William Rendall Johnson, Kent; Ralph Raleigh Welsh, Bellevue, both of Wash.

[73] Assignee: The Boeing Company, Seattle, Wash.

[21] Appl. No.: 818,910

[22] Filed: Jul. 25, 1977

[51] Int. Cl.² .............................. B31F 1/20; B31F 1/22
[52] U.S. Cl. ....................................... 428/119; 52/734; 156/210; 428/178; 428/182; 428/184
[58] Field of Search ............... 428/174, 182, 184, 119, 428/178, 317; 156/210; 52/734

[56] References Cited
U.S. PATENT DOCUMENTS

| 3,137,604 | 6/1964 | Bosch | 156/207 |
| 3,333,389 | 8/1967 | Lichti | 52/729 |

Primary Examiner—Edward G. Whitby
Attorney, Agent, or Firm—Daniel T. Anderson; Bernard A. Donahue; Robert W. Jenny

[57] ABSTRACT

The invention disclosed is (1) a sine wave web for structural elements made of composite materials, (2) structural combinations incorporating the web, and (3) a method of manufacturing the web. The concept disclosed avoids bunching and distortion of the fibers of the composite web material as it is shaped and flanged for attachment to adjacent structure, such as the chords and capstrips of an I-beam.

6 Claims, 12 Drawing Figures

SINE WAVE BEAM WEB AND METHOD OF MANUFACTURE

BACKGROUND OF THE INVENTION

The subject invention is in the general field of design and manufacture of structural components. More particularly, it relates to components particularly advantageous for aircraft and other vehicles, such as ribs and beams, which must be lightweight relative to their strength and stiffness. Still more particularly, it relates to the design and manufacture of such components from composite materials, as different from more conventional materials such as aluminum alloys, steel alloys and plastics. As is well known in the art, composite materials are made from fibers of various kinds and types, in cloth and/or tape orientations, integrated and partly or completely surfaced by a binder material, usually a plastic.

One well known technique for achieving the aforementioned high stiffness relative to weight in structural components which include a web is to use a sine wave web. Such a web, instead of being flat, is corrugated, a sine wave shape being preferred, the corrugations being oriented transverse to the lengthwise dimension of the web and component. Use of this technique with composite materials presents serious problems in orienting the fibers so that they are appropriately spaced and not bunched in local areas and too sparsely distributed in others, and so that all of the fibers are relatively evenly tensioned, rather than being slack or unduly strained.

Given an adequate sine wave web made of composite materials, there is the further problem of transmission of structural loads between the web and associated structure. Using an I-beam as an example, the component would include the web and two juxtaposed flanges, one attached to each edge of the web. It is well known that it is highly desirable for the load transmission between flanges and web to be shared between the fibers of the structural elements and the binder, rather than having the binder or an adhesive carry most of the loads. Achieving load transfer by the fibers has proven to be a difficult problem when using elements made of composite materials.

The subject invention is specifically directed to solving these problems inherent in providing structural components with sine wave webs and made from composite materials.

There is no known prior art showing successful construction of such components. U.S. Pat. No. 101,015 shows a beam with a corrugated web. However, the beam is metal and fabrication does not present the problems encountered with composite materials as previously discussed.

U.S. Pat. No. 3,333,389 shows a girder having a corrugated web. Again, the material is metal and the discussed problems are not presented.

U.S. Pat. No. 3,137,604 shows a honeycomb structure in which the core is made up of what can be considered to be a series of corrugated webs and these webs are attached by adhesives to each other and to skins on each side of the core. The skins are equivalent to flanges for each web in the series forming the core. As the patent explains, and as has been explained above, the attachment of the core webs to the skins (flanges) presents serious difficulty. The patent proposes embedding fibers in the webs with the fibers extending beyond the edges of the webs, as shown in FIG. 2 of the patent. The fibers are then bent normal to the planes of the web, as shown in FIG. 4, and embedded in the adhesives used to fasten the core to the skins. The bonds between the cores and skins are improved by this technique; however, experience has shown that further improvement is desirable.

SUMMARY OF THE INVENTION

The basis for the improvement provided by the structural aspects of the subject invention is the shape of the web. The shape allows for three specific things: (1) the web proper can be corrugated, sine wave preferred, with the corrugations transverse to the length of the web; (2) the fabric of the composite material used in the web proper can be extended to form flanges integral with the web; and (3) the fabric conforms to the integrated shapes of the web and flanges without wrinkling, bunching or stretching. This conformation can be achieved when the fibers of the fabric are at 45° to the direction of the corrugations and correspondingly to the length of the web.

The integrated web and flanges can be used as a structural element complete in itself. Also, it can be integrated into more complex structures. In particular, two flanged webs can be assembled back-to-back with their corrugations nested and flanges facing oppositely so that the combination has an I cross section. Fillers and capstrips can be added to build up the section modulus still further, if desired. The size and detail shape of the flanges can also be varied to produce desired structural characteristics.

The various parts are made with materials and techniques well known in the art. Fibrous fabrics, either woven or in filament tape form, are impregnated with resins, either thermosetting or thermoplastic. The impregnated materials are then used in manufacturing parts and the parts are assembled in appropriate tooling and bonded together using the characteristics of the impregnating plastics or appropriate adhesives.

Using an I-beam assembly as an example, precision, so-called hard tooling is used to hold and shape the capstrips; the flanged web assemblies are pressed into place with elastomeric backing pads to allow for and accommodate minor dimensional variations and the parts are bonded into a complete structural assembly while held in the tooling.

Structural assemblies as herein described solve the problems discussed above relating to the design and manufacture of structural elements, such as I beams having sinusoidally corrugated webs and made of composite materials. The fibrous material of the web and flanges is continuous and smooth, assuring even loading of the fibers, smooth contours and optimum load transfer between web and flanges.

DETAILED DESCRIPTION OF THE INVENTION

Figure 1:
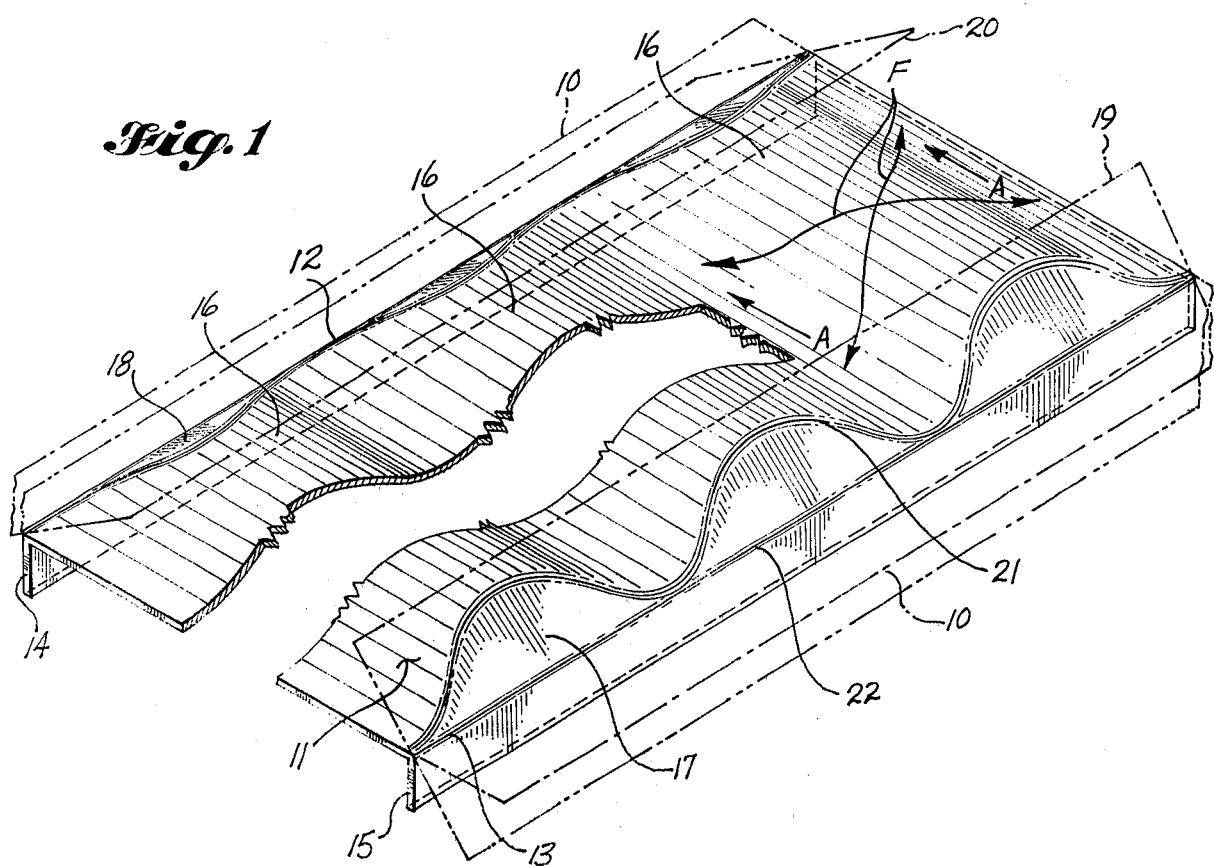
FIG. 1 is a perspective view of an example of a flanged, corrugated web constructed in accordance with the principles of the invention.

The subject design and manufacture of structural elements made of composite materials and having sinusoidally corrugated webs are based on a concept for the shape of the web and flanges made integral with it to enable highly efficient load transfer between the web and flanges and structure attached to the flanges. An example of the shape of the combined web and flanges is shown in FIG. 1. The shape is described using a plane 10 as a base of reference, i.e., a base plane. A web 11 has edges 12 and 13 (straight and parallel to each other, in this example) lying in plane 10. A pair of juxtaposed flanges 14 and 15 are integrally formed with web 11 at edges 12 and 13 and extend at an angle, usually about 90°, to plane 10. Web 11 has protrusions 16 formed in it and extending out of plane 10 in the opposite direction from flanges 14 and 15. Protrusions 16 are a continuous series and form corrugations. The corrugations are preferably shaped so that their section viewed at the center of plane 10 in the direction indicated by arrows A is generally sinusoidal, as indicated by the dashed lines. Each protrusion has two ends, 17 and 18. All of ends 17 lie in a plane 19 which is parallel to edges 12, disposed, in this example, at 45° to plane 10 and sloped so that it rises away from plane 10 in the same direction as protrusions 16. All of ends 18 lie in a plane 20 which is parallel to edge 13, disposed at 45° to plane 10 and sloped so that it rises away from plane 10 in the same direction as protrusions 16. Accordingly, the planes 19 and 20 of the ends 17, 18 converge toward each other at 45° angles from plane 10. Protrusions 16, ends 17, 18 and flanges 14, 15 are smoothly radiused into each other at all intersections, with radiused surfaces 21, 22, for example. The surface of the part facing away from the flanges is referred to as the back of the part.

Experimentation and experience have shown that fibrous material, when the fibers are oriented essentially at 45° as indicated by arrows F, will conform to the shape as described without wrinkling, bunching, spreading or going slack. This provides the capability of excellent load transfer between the flanges and web. The sinusoidal corrugations provide the desired structural stability even though the material itself is relatively thin and light, as the characteristics of composite materials permit them to be, relative to load-carrying capabilities.

Figure 2:
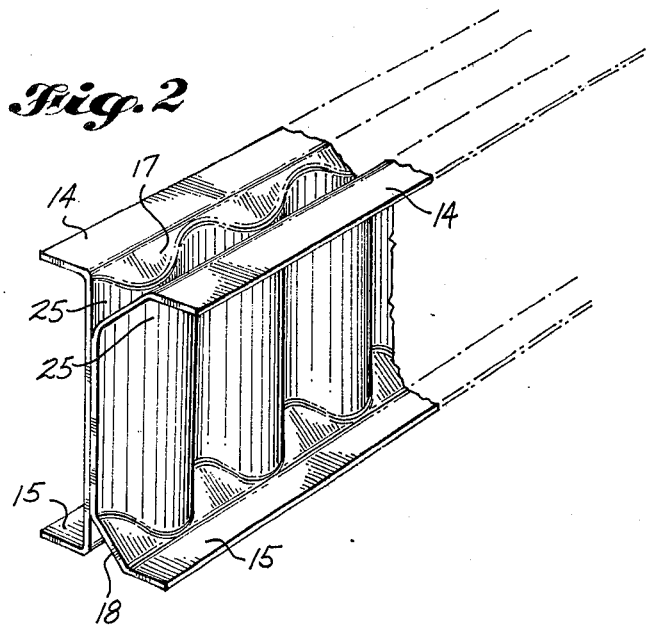
FIG. 2 is a perspective view of two flanged, corrugated webs nested back-to-back.

FIG. 2 shows two of the flanged webs of FIG. 1 arranged back-to-back, producing an I-beam configuration with a sinusoidal web. Bonding the webs together produces an I-beam which is particularly useful in certain circumstances.

Figure 3:
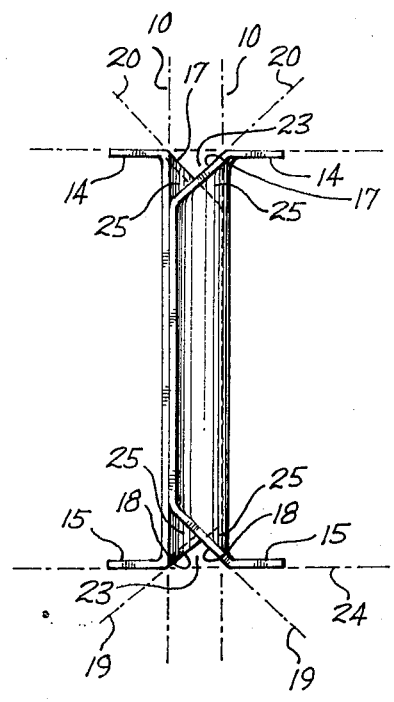
FIG. 3 is an end view of the nested webs of FIG. 2, showing characteristics of the web-to-flange transition of the flanged webs.
Figure 4:
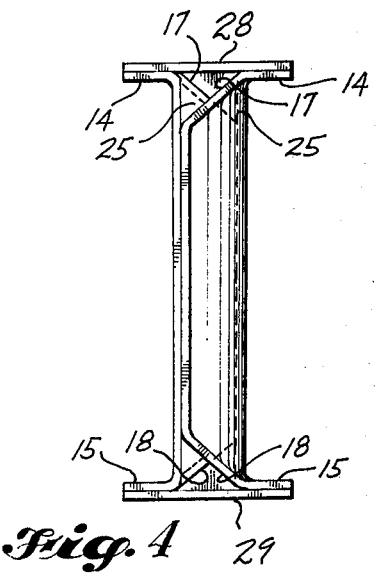
FIG. 4 is an end view of the beam of FIG. 3 with chords and capstrips added.

FIG. 3 is an end view of the beam of FIG. 2 and shows in more detail the configuration of the beam formed by joining the two flanged webs back-to-back. The two base planes 10 are spaced apart and the sloped ends 17 and 18 intersect in this view forming triangular gaps 23 bounded by the planes 19 and 20 of the ends 17 and 18 and a pair of planes 24 through the flanges 14 and 15. There are also small pockets 25 bounded by the back surfaces of the webs and the planes 19 and 20. To add to the stability of the I-beam, pockets 25 can be filled with foam plastic; for example, gaps 23 filled with chord members 26 and 27; and capstrips 28 and 29 added, as shown in FIG. 4, the assembly being bonded into an integral beam using tooling described below.

Figure 5:
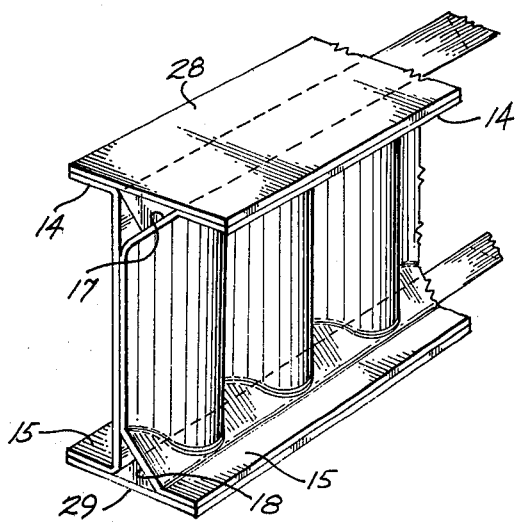
FIG. 5 is a perspective view of the beam shown in end view in FIG. 4.
Figure 6:
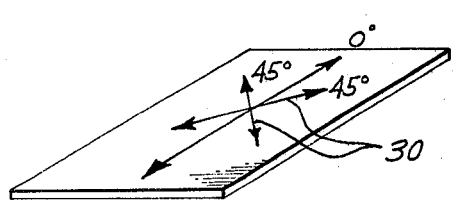
FIG. 6 is a perspective view of a section of capstrip showing the direction of orientation of the fibers.

FIG. 5 is a perspective view of the beam shown in end view in FIG. 6.

Figure 7:
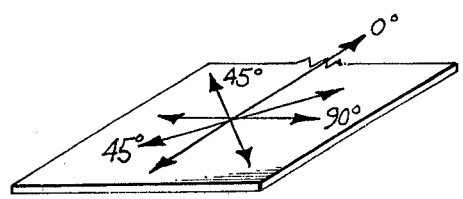
FIG. 7 is a perspective view of a section of unformed web material showing the directions of orientation of the fibers.
Figure 8:
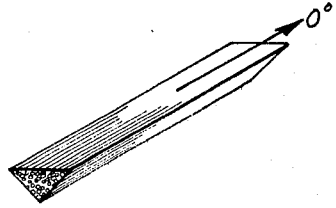
FIG. 8 shows fiber orientations in a chord member of the beam.

As is well known in the art, the characteristics of structure made from composite materials are determined in part by the orientation of the fibers of the materials. FIGS. 6, 7 and 8 illustrate fiber orientations suitable to the teaching of this disclosure and to producing a general purpose beam. FIG. 6 shows the fiber orientation in the capstrip material. Most of the fibers are oriented at 45° to the length dimension of the strip, half at minus 45° and half at plus 45°, as indicated by arrows 30. The remaining fibers are oriented at 0°, i.e., along the length dimension. These fibers are useful when the strip is to be manufactured by the pultrusion process, in which the fibers are formed in plies, preimpregnated with resin and pulled through dies for continuous compacting and curing. Curing can be complete or partial, depending on the future treatments to be applied to the pultruded material.

FIG. 7 shows the fiber orientations in a flat, unformed sheet of web and flange material. The material is the same as for the capstrips, shown in FIG. 6, except for the addition of fibers at 90° to the length of the part to increase the compressive strength of the beam in the direction parallel to the corrugations.

FIG. 8 shows the fiber orientation in the chords, i.e., all fibers running lengthwise of the chord (0° orientation), because the chords are loaded almost entirely in tension and compression in the lengthwise direction.

Figure 9:
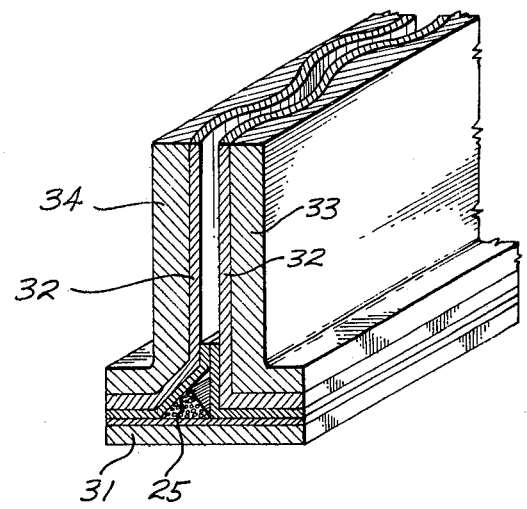
FIG. 9 is a sectional perspective view of two nested flanged webs, a chord and a capstrip held in place in tooling for bonding.

FIG. 9, semi-schematically illustrates a beam assembly including two web and flange parts and a chord member and capstrip held in the tooling which forms the webs and flanges for bonding into an integrated beam. A block 31 positions the capstrip positively for adequate dimensional control. Elastomeric pads 32 are positioned between a pair of form blocks 33 and 34 so that when force is applied to blocks 33 and 34, the pads 32 distribute the resistive pressure evenly on the web and flanges while accommodating minor dimensional irregularities. The beam and tooling are illustrated in section at a point which reveals one of the pockets 25 which may be left empty or filled with plastic for added strength and stiffness as desired.

Figure 10:
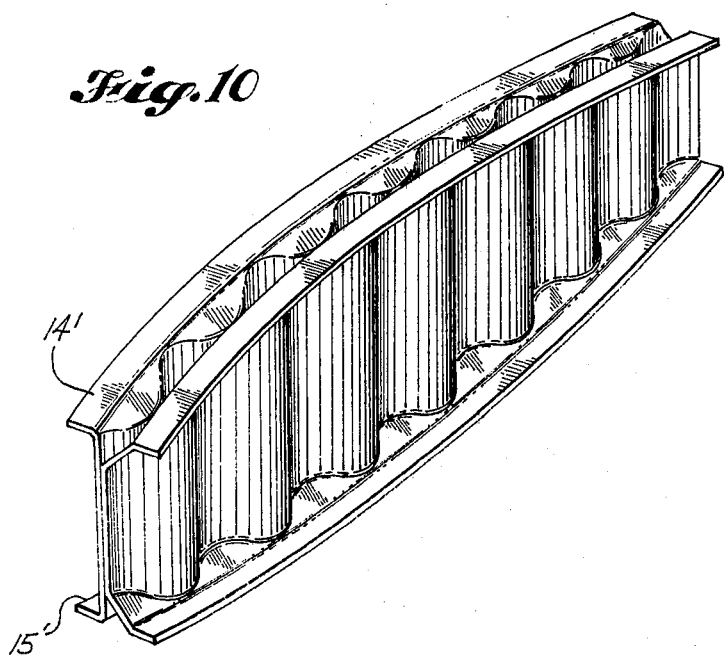
FIG. 10 is a perspective view of a beam with non-parallel flanges.

FIG. 10 illustrates an embodiment of the invention in which the flanges 14', 15', and chords and capstrips (not shown) are curved and not parallel, as in fabricating a section of a rib of an airplane wing in accordance with another example of the invention.

Figure 11:
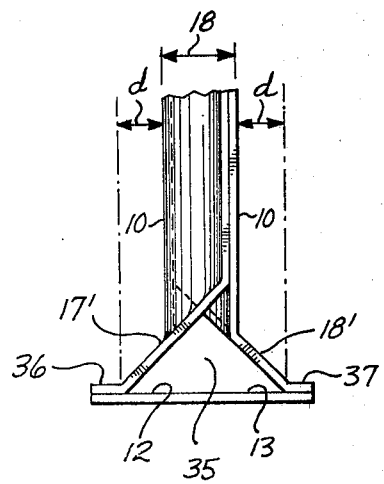
FIG. 11 is an end view of an I-beam assembly showing an alternate configuration.

FIG. 11 shows an alternate cross-sectional shape of the flanges 14", 15", which accommodates larger chord members 35 to enhance the bending strength and stiffness of the beam. The ends 17' and 18' are extended beyond edges 12 and 13 of base plane 10 of web 13 so that flanges 36 and 37 are displaced a distance d from the edges 12 and 13 of the base plane 10 instead of being integrally formed with the web at the edges.

Figure 12:
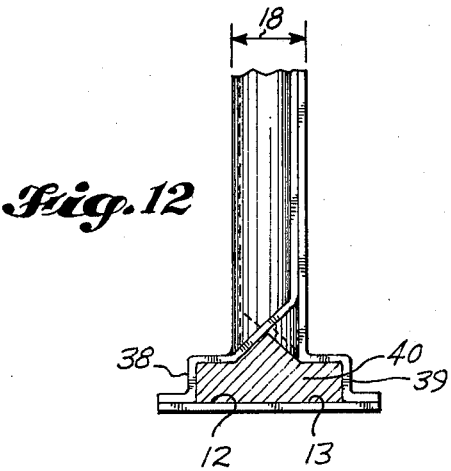
FIG. 12 is an end view of an I-beam assembly showing a second alternate configuration.

FIG. 12 shows a second alternate cross-sectional shape of the flanges, as a further example of the scope of the subject invention. The flanges 38 and 39 are integrally formed with webs 11 at edges 12 and 13 but, instead of being flat like flanges 14 and 15, they are formed as shown, again to provide a larger cross section of the chord member 40 for added strength and stiffness of the beam, particularly in the bending mode.

In the light of this disclosure it is evident that the subject invention solves the problems previously experienced in the design and fabrication of composite materials structures incorporating a corrugated web. With the described shapes of the web and flanges, the fibers can be evenly spaced and uniformly loaded. Also, because the web and flanges are made from the same continuous fabric, the load transfer between flanges and web is highly efficient, being carried primarily by the fibers instead of by the resin and/or other bonding agents. Further, the concept allows for adequate design flexibility, being adaptable to a wide range of design requirements by variation of several factors, including web shape, web thickness, fiber orientations and chord, and flange and capstrip shapes and dimensions.

While several examples of the inventions are disclosed, it is clear that many embodiments are possible in accordance with the essence of the invention, and accordingly, its scope should be considered to be limited only by the appended claims.

We claim:

1. A structural channel having a length and a back surface, and a web having a base plane and two edges, said edges being in said base plane, a first flange integrally formed with said web at one of said two edges, a second flange integrally formed with said web at the other of said two edges, said first and second flanges being disposed at a predetermined angle to said base plane of said web and extending in a first direction from said base plane, said web having corrugations in the form of sequential protrusions, each protrusion extending from one of said two edges to the other, said protrusions protruding from said base plane in a second direction opposite to said first direction, said second direction being the direction said back surface faces from said base plane, each of said protrusions having two ends, each of said ends intersecting one of said edges of said web, each of said ends of each protrusion being oriented substantially at 45° to said base plane, said ends of each said protrusion sloping toward each other, the overall conformation being such that fibrous fabric, oriented with its fibers at 45° to said protrusions and pressed against said structural channel will conform uniformly to said web and said flanges without wrinkling of said fabric or stretching of said fibers.

2. The structural channel of claim 1 in which said protrusions are shaped so that they form a sinusoidal pattern in a cross-sectional view taken normal to said base plane and bisecting said channel member along said length.

3. A structural element having an I cross section, comprising two structural channels as claimed in claim 1, one left-hand, one right-hand, assembled with said back surfaces juxtaposed and said flanges co-planar, said ends of said protrusions forming V-shaped grooves bounded by said ends of said protrusions and the planes of said co-planar flanges.

4. A structural element having a I cross section comprising the structural element of claim 3, triangular cross-section chord members assembled in said V grooves, and capstrips assembled onto said chord members and said flanges.

5. A structural element having an I cross section comprising two structural channels as claimed in claim 2, one left-hand, one right-hand, assembled with said back surfaces in contact and said flanges co-planar, said ends of said protrusions forming V-shaped grooves bounded by said ends of said protrusions and the planes of said co-planar flanges.

6. A structural element having an I cross section comprising the structural element of claim 5, triangular cross-section chord members assembled in said V Grooves, and capstrips, assembled onto said chord members and said flanges.

* * * * *